D. G. VEDDER.
METHOD AND APPARATUS FOR SHUTTING WATER OUT OF OIL WELLS.
APPLICATION FILED JUNE 9, 1919.
1,342,780.
Patented June 8, 1920.
8 SHEETS—SHEET 1.
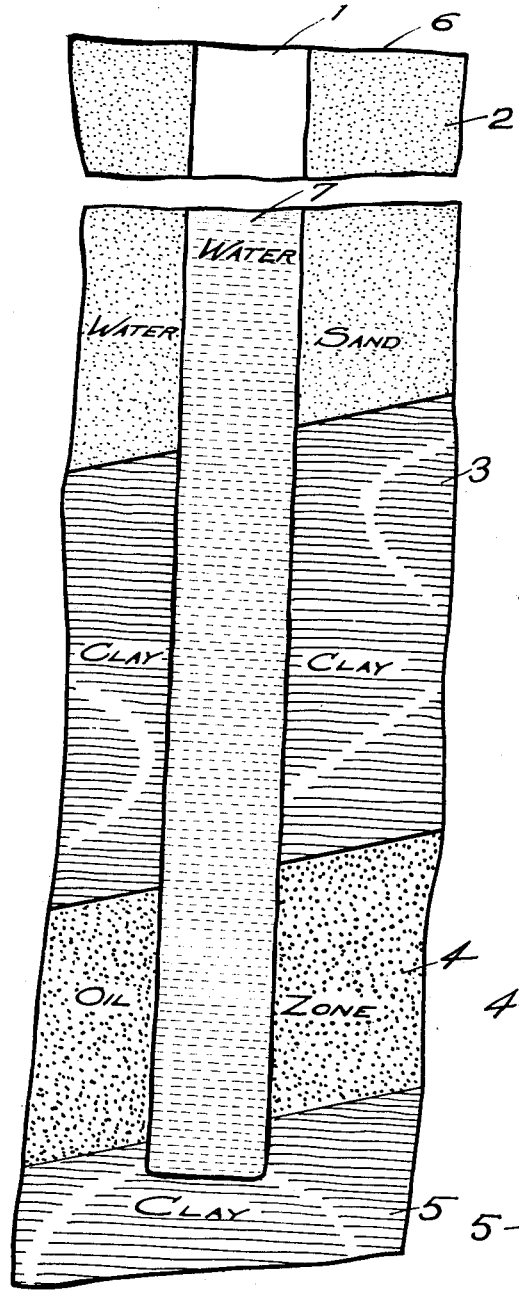
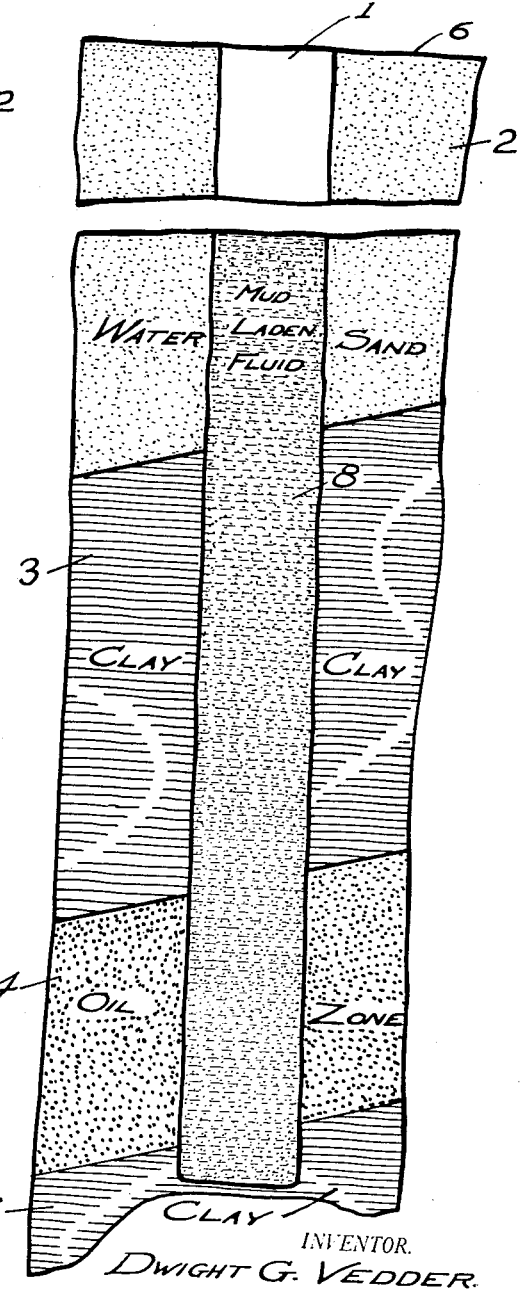
INVENTOR.
DWIGHT G. VEDDER.
BY
Hazard & Miller
ATTORNEYS.

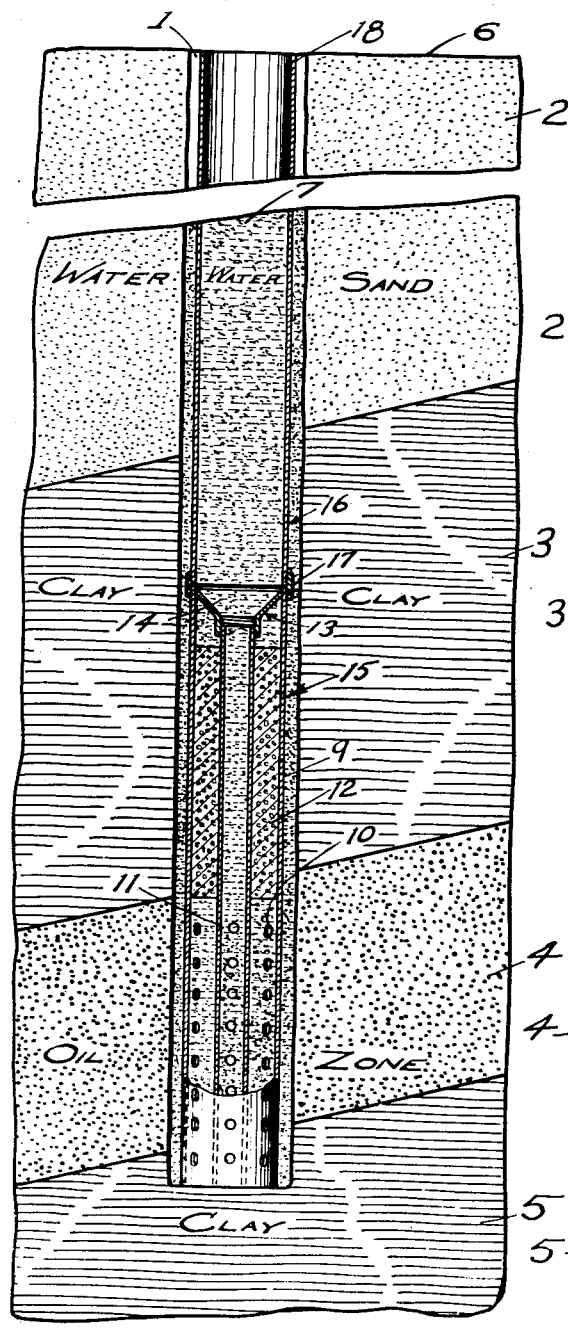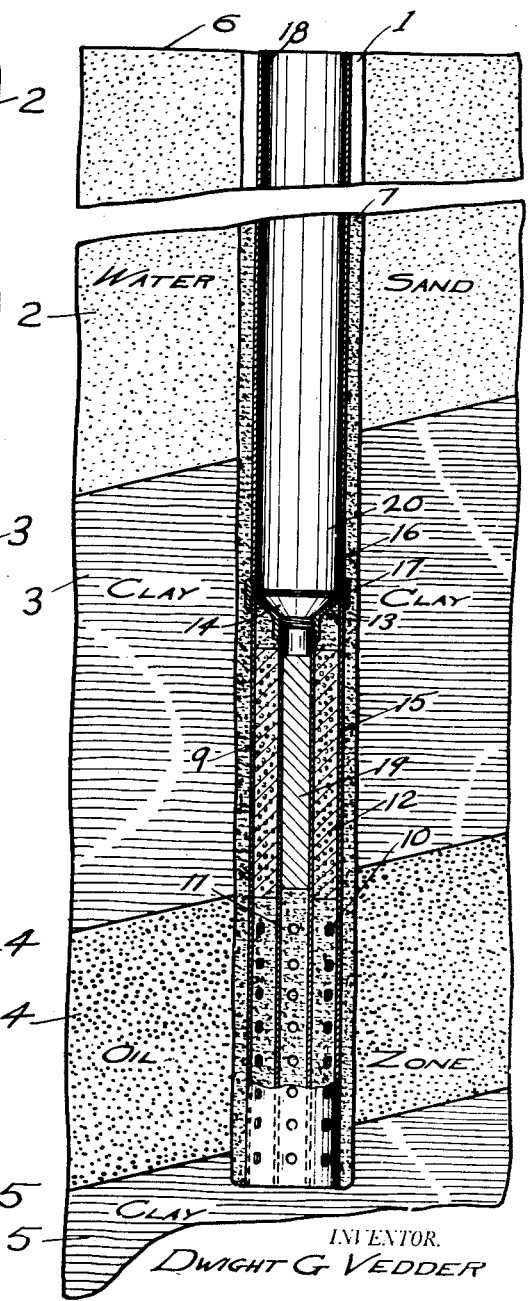

D. G. VEDDER.
METHOD AND APPARATUS FOR SHUTTING WATER OUT OF OIL WELLS.
APPLICATION FILED JUNE 9, 1919.
1,342,780.
Patented June 8, 1920.
8 SHEETS—SHEET 3.
FIG. 5.
FIG. 6.
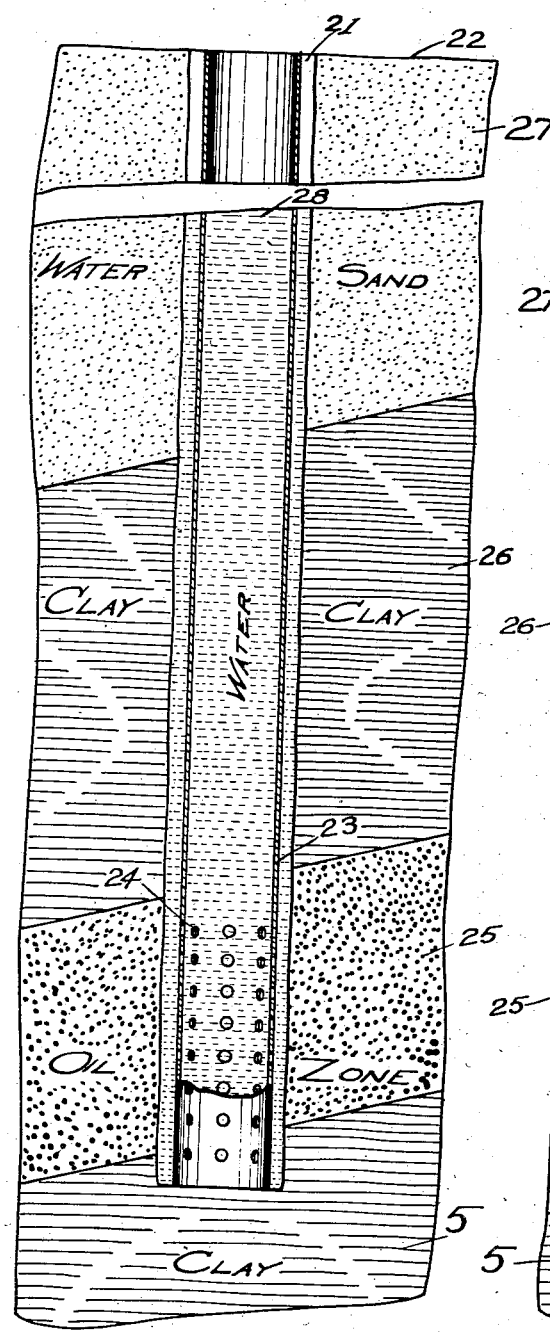
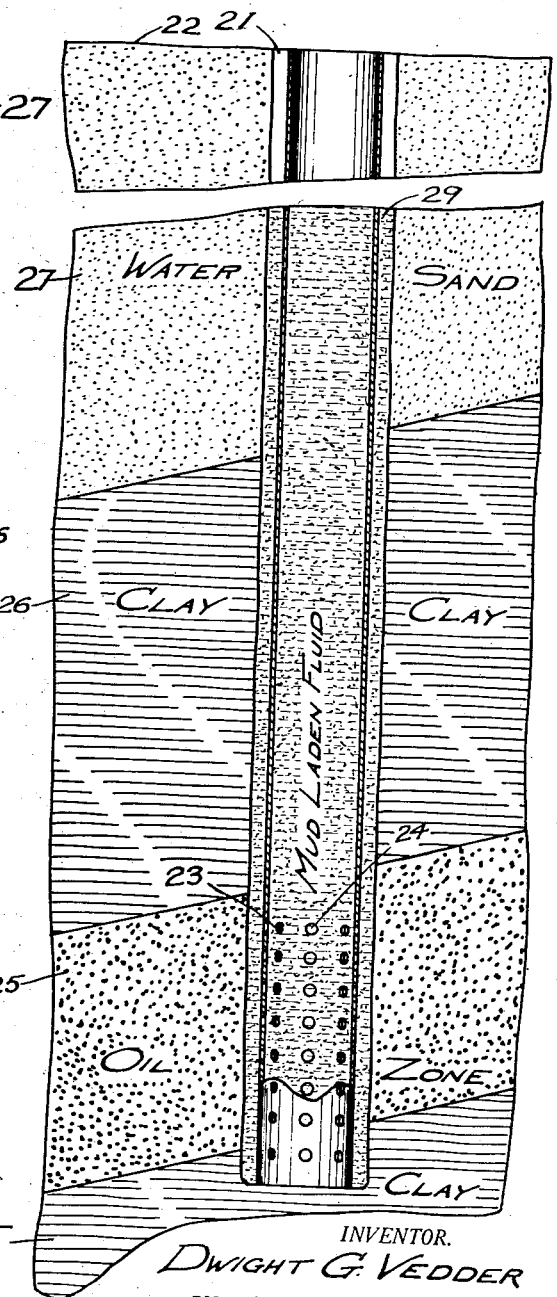
INVENTOR.
DWIGHT G. VEDDER
BY
ATTORNEYS.

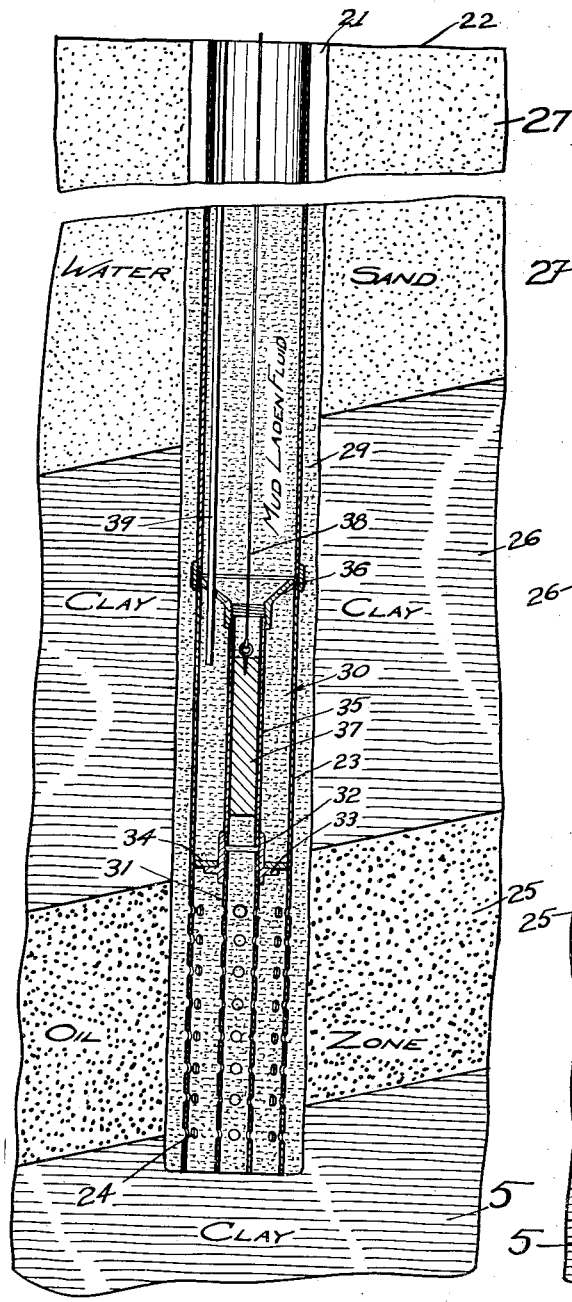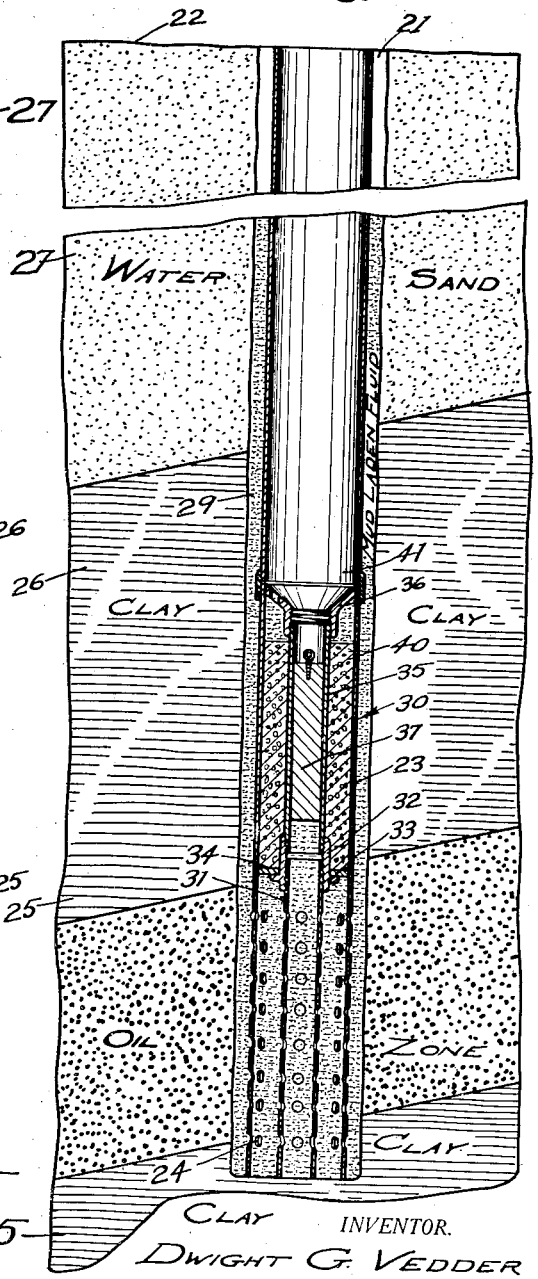

D. G. VEDDER.
METHOD AND APPARATUS FOR SHUTTING WATER OUT OF OIL WELLS.
APPLICATION FILED JUNE 9, 1919.

1,342,780.

Patented June 8, 1920.
8 SHEETS—SHEET 5.

INVENTOR.
DWIGHT G. VEDDER
BY
ATTORNEYS.

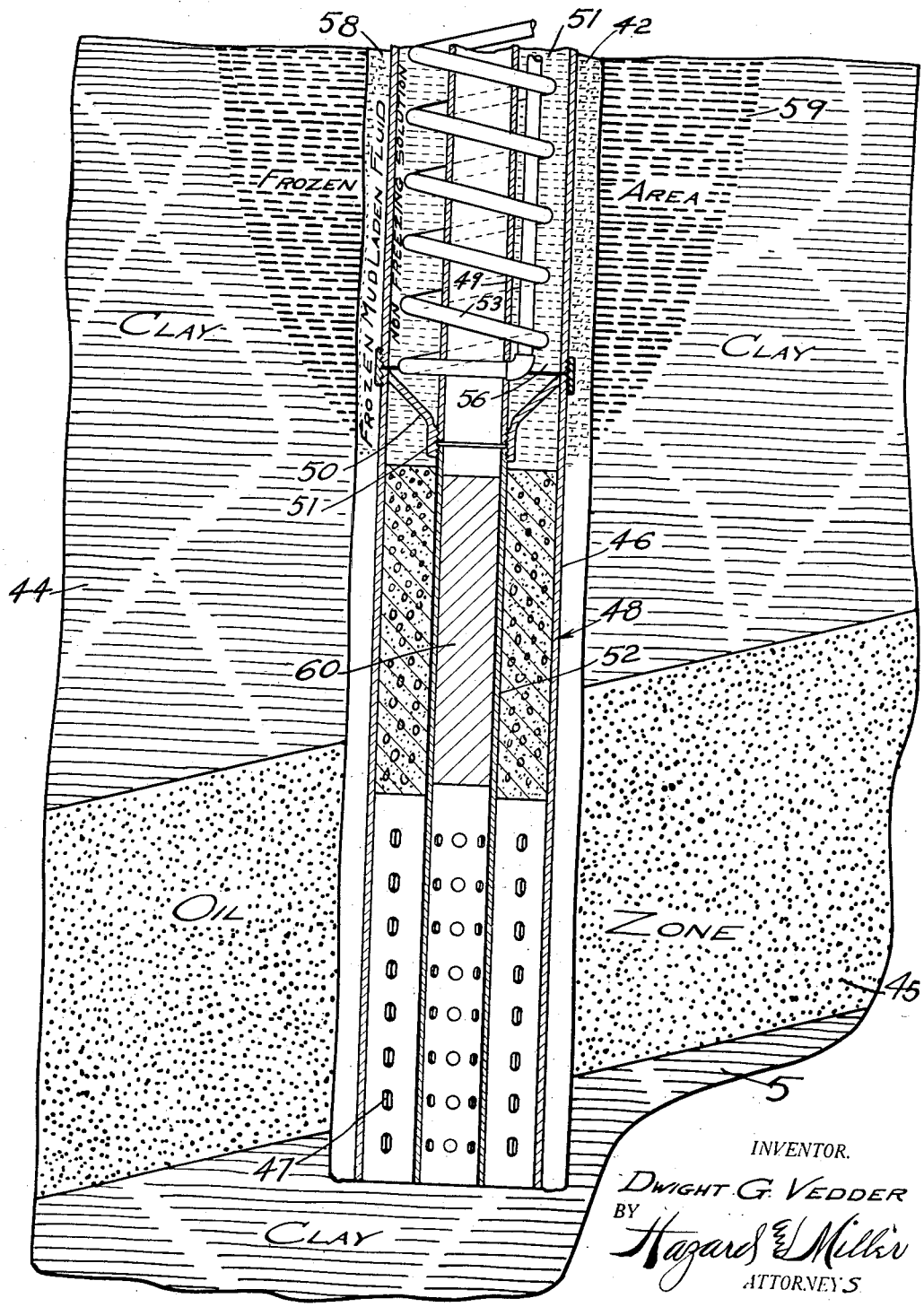

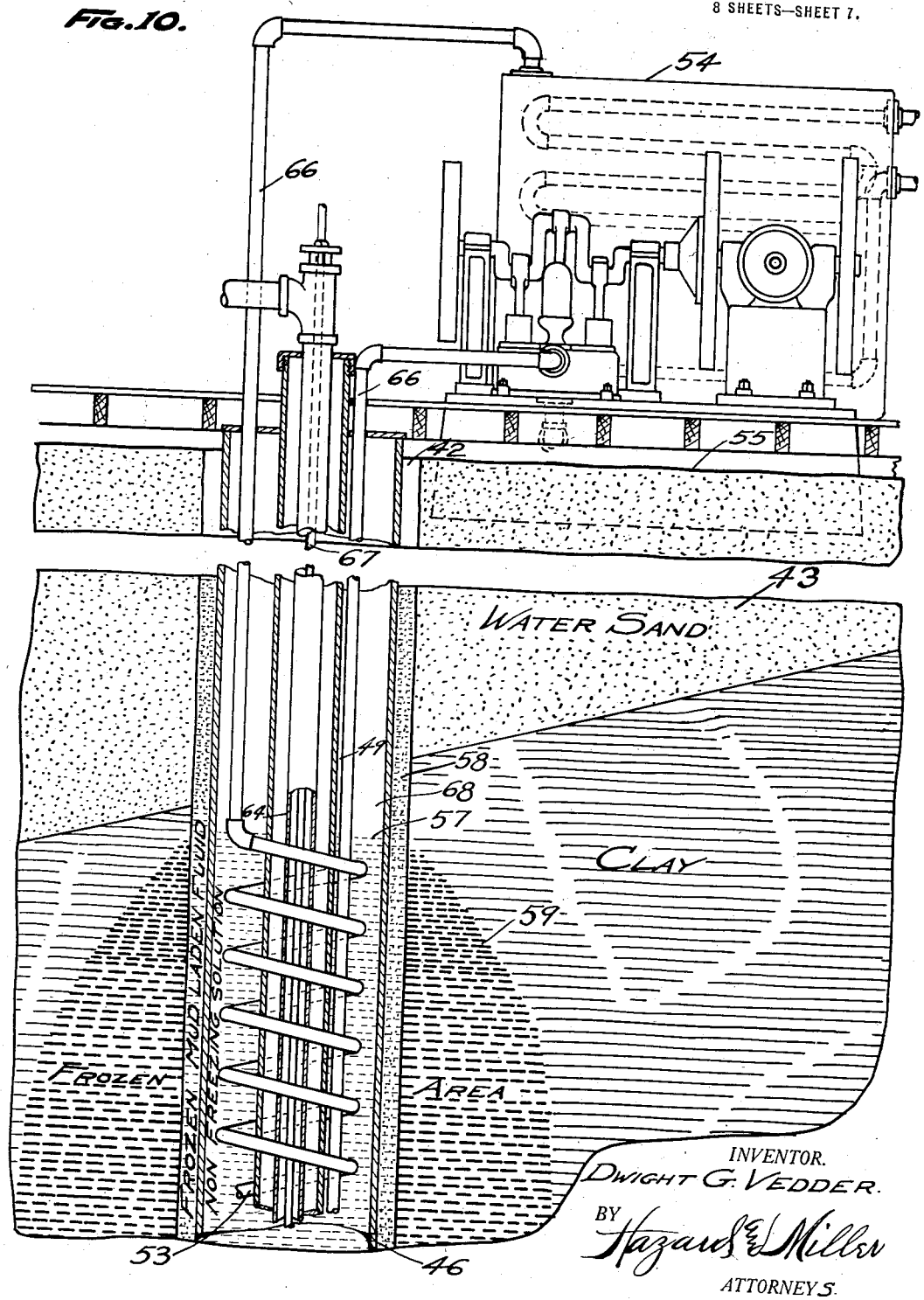

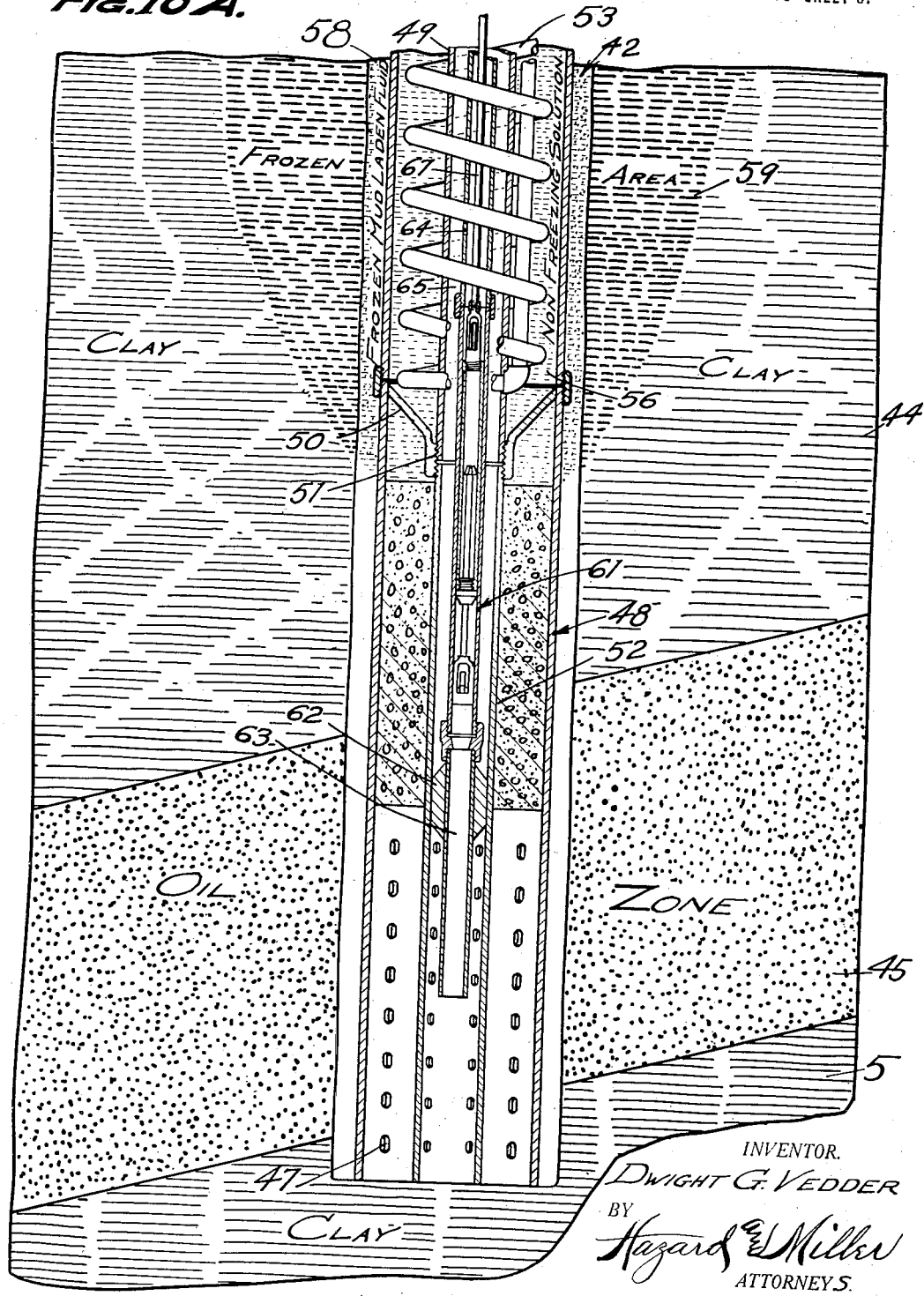

UNITED STATES PATENT OFFICE.

DWIGHT G. VEDDER, OF BAKERSFIELD, CALIFORNIA.

METHOD AND APPARATUS FOR SHUTTING WATER OUT OF OIL-WELLS.

1,342,780. Specification of Letters Patent. Patented June 8, 1920.

Application filed June 9, 1919. Serial No. 302,878.

*To all whom it may concern:*

Be it known that I, DWIGHT G. VEDDER, a citizen of the United States, residing at Bakersfield, in the county of Kern and State of California, have invented new and useful Improvements in Methods and Apparatus for Shutting Water Out of Oil-Wells, of which the following is a specification.

My object is to produce a method and apparatus for shutting water out of oil wells, and my invention consists of the novel features herein shown, described and claimed.

All the views are vertical sections of an oil well and illustrate various stages of my method and apparatus for shutting water out of an oil well.

Figure 1 shows an oil well produced with a rotary rig and before the casing has been put down.

Fig. 2 is a view analogous to Fig. 1 and shows the first step in shutting water out of the well.

Fig. 3 shows the introduction of the casing and the water barrier between the outside casing and the smaller pump tubing conductor casing.

Fig. 4 shows the plug in the pump tubing conductor casing and the water exhausted from above the plug.

Figs. 5 and 6 are views analogous to Figs. 1 and 2 and represent a well produced by a standard rig and having the casing in the well. Fig. 5 shows the water in the well and Fig. 6 shows the introduction of the mud in the bottom of the well.

Fig. 7 shows the water barrier inside of the casing shown in Fig. 6.

Fig. 8 shows the casing pumped dry above the water barriers.

Figure 9:
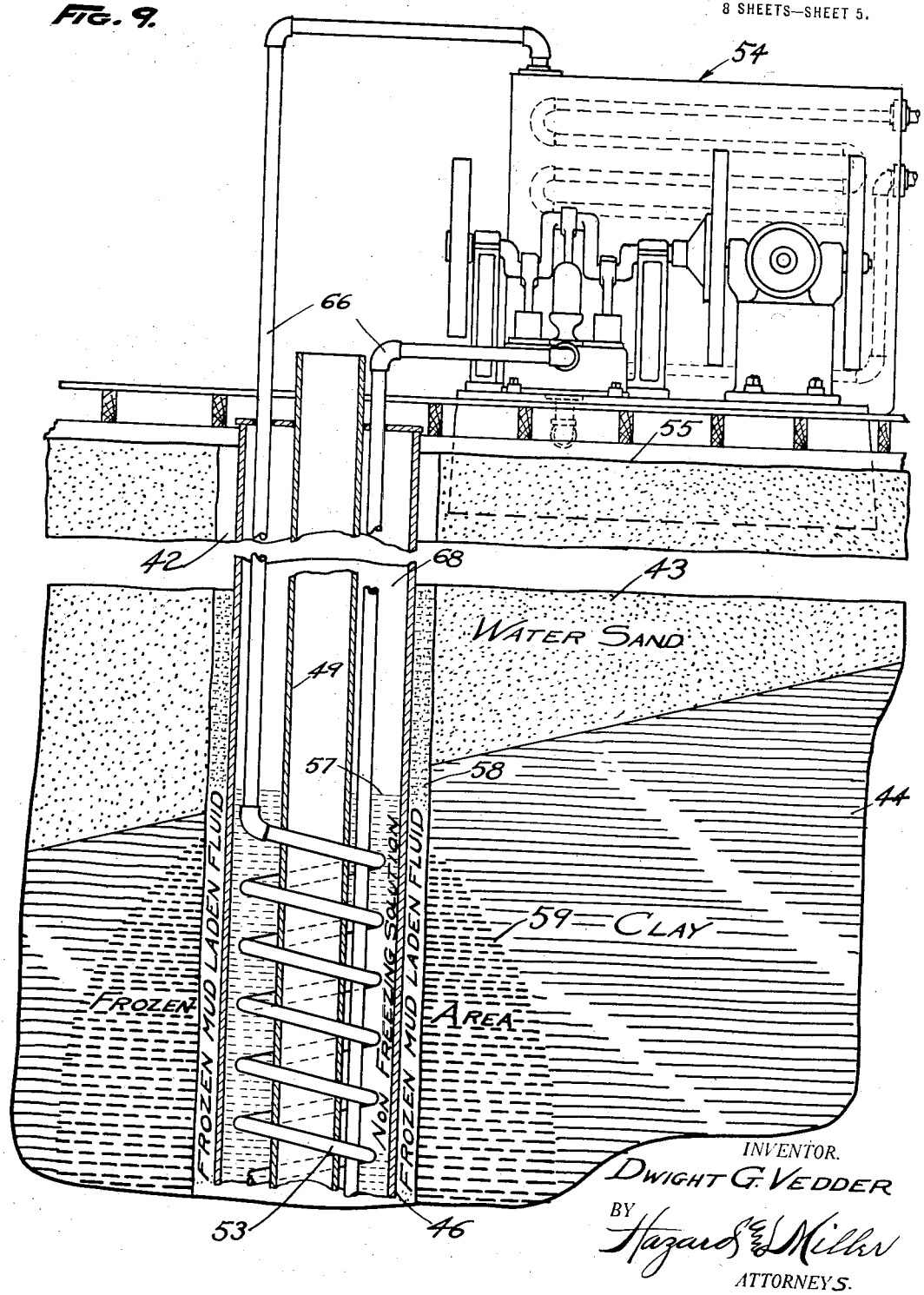

Figs. 9 and 9^A show the introduction of freezing operation and apparatus to freeze the mud and water around the casing and keep the water from going down to the oil zone.

Figs. 10 and 10^A show the introduction of the pump tubing, pump and rods by means of which to pump the oil from the oil zone while the water is shut off by freezing, the two operations proceeding simultaneously and continuously.

It is to be understood that all of the figures hereinafter given, that is, sizes, depths and so on, are simply an example and that other conditions would require other figures.

Referring to Figs. 1, 2, 3 and 4, suppose that the well 1 has been drilled with a rotary rig to the depth of 2410 feet. In producing wells by the rotary method the entire well hole is drilled before the casing is placed in the hole. Suppose that this well hole 1 is large enough for a 12 inch casing. At the depth of 2300 feet the well hole passes through the stratum 2 of water sand into the stratum 3 of impervious clay. At a depth of 2345 feet the well hole passes through the impervious clay 3 to the oil zone 4, and at the depth of 2365 feet from the surface the well hole encounters the stratum 5 of impervious clay. The inexhaustible supply of water in the water sand 2 fills the well hole 1 to within 300 feet of the top of the well hole, that is the surface 6 of the ground. The water having a greater specific gravity than the oil encountered will displace this oil, forcing it back into the formation and of course it cannot be produced under such conditions.

The problem is to shut the water from the water sand 2 out of the well hole 1 and take oil from the oil zone 4.

The first step in carrying out my method and starting with the well hole 1, shown in Fig. 1 practically full of water, is to mud the well hole up from the bottom to and above the point where the water is to be shut off. In Fig. 1, I have shown the water 7 extending upwardly to the break in the water sand 2, and in Fig. 2 I have shown the mud laden fluid 8 extending from the bottom of the well hole up to the break.

Mud laden fluid is used to reduce the specific heat of the material to be frozen and this in turn lessens the time period and cost of congelation. The mud laden fluid thus frozen also has a greater tensile and compressive strength than pure ice.

Then I take 100 feet of 12 inch casing and 100 feet of 4½ inch casing and place the 4½ inch casing inside of the 12 inch casing and I place a solid water barrier in the 12 inch casing around the 4½ inch casing.

In Fig. 3 the lower end of the 12 inch casing 9 has perforations 10 to allow the oil to pass inside of the 12 inch casing from the oil zone 4. The perforations 10 should extend throughout the lower 65 feet of the 12 inch casing. The lower 65 feet of the 4½ inch casing 11 is likewise perforated. The water barrier 12 is placed in the 12 inch casing outside of the 4½ inch casing above the perforations 10 and 11 and this water barrier may be ten or more feet long, that is up and down between the casings and may be formed of hydraulic cement or the like, the cement being thoroughly cured before inserting the casings into the well. This barrier 12 is now between 2315 feet and 2325 feet down in the well.

A bell-shaped fitting 13 is placed upon the upper end of the 4½ inch casing and fits closely within the 12 inch casing so as to make a downwardly tapered opening 14 leading from the inner face of the 12 inch casing to the line of the 4½ inch casing. This fitting is 100 feet from the bottom of the well hole.

After the 100 feet of the 12 inch casing and the 100 feet of the 4½ inch casing and the barrier 12 and fitting 13 have been prepared, a fluid barrier base 15 is produced and this base is coupled on to the string 16 of the 12 inch casing and lowered into the well in the usual way, there being a coupling 17 connecting the base 15 to the string 16 and the string 16 being made up and lowered as usual to the total length of 2410 feet, thus bringing the upper end 18 of the 12 inch casing to the top 6 of the ground. In drilling with the rotary method the well hole is kept continually filled with mud laden fluid so that at this time the 100 feet of 4½ inch casing 11 stands filled with the mud laden fluid 8 and the fluid extends upwardly in the 12 inch casing and inside and outside of the perforated portions 10 and 11. This mud or mud laden fluid has a specific heat considerably lower than pure water which lessens the time period and cost of congelation. The frozen mud laden fluid also has a greater tensile and compressive strength than frozen water.

Mud laden fluid has to be introduced into a hole drilled by the "Standard or cable tool method." The mud is crushed, mixed and forced down inside of the casing and up around the outside of same by means of a slush pump. Sometimes the dry mud is simply shoveled into the hole and mixed by the reciprocating action of the drilling tools.

Referring to Fig. 4, the next step is to get the water and mud laden fluid out of the 12 inch casing above the fluid barrier base 15. A plug 19 is placed down through the water and mud in the 12 inch casing until it comes to the fitting 13 and then the plug is guided into the 4½ inch casing and driven tightly down into the casing in the same level as the barrier 12, thereby effectually closing the lower end of the string 16 of the casing; then the mud and water is pumped from the 12 inch casing thus leaving a dry chamber 20 above the plug 19. The plug or temporary barrier 19 may be made of wood, cement, rubber, or in any suitable way. The plug 19 may be manipulated in various ways for insertion into the proper place in the fluid barrier base 15.

Referring to Figs. 5, 6, 7 and 8, it is assumed that the well hole 21 is drilled from the surface 22 of the ground with a standard drilling rig and that the well hole is the same depth and passes through the same formations as the well hole 1. In this case the 12 inch casing 23 is in the well hole and the lower 65 feet of the casing 23 has perforations 24 opposite the oil zone 25. The stratum 26 of clay is above the oil zone 25 and the water from the water sand 27 above the clay stratum 26 is flowing from the sand downwardly between the outside of the casing 23 and the side of the drill hole 21, the heavier water thus forcing the oil back into the formation where it must remain and pumping under such a condition will bring nothing but water to the surface 22.

In Fig. 5 I have shown the water 28 in the casing 23, and in Fig. 6 I have shown the mud laden fluid 29 in the casing 23 and outside of the casing in the well hole 21 and extending upwardly into the water zone 27. The mud for this purpose is forced downwardly through the casing 23 and outwardly through the perforations 24 and upwardly around the casing 23. Inserting the mud is the first step in my method.

The details of the fluid barrier base 30 are as follows:

65 feet of perforated 4½ inch casing 31 are prepared, a coupling 32 is screwed upon the casing 31, a supporting flange 33 extends outwardly from the coupling 32, and a plate 34 is placed around the coupling upon the flange 33, said plate being of a size to fit tightly upon the coupling and slidingly in the 12 inch casing 23. A 10 foot piece of 4½ inch casing 35 is screwed into the coupling 32, a bell-shaped fitting 36 is screwed upon the upper end of the casing 35, a plug 37 is fitted into the casing 35, the cable 38 is attached to the plug 37, a 2 inch pipe 39 is inserted through the fitting 36 at one side of the center and the entire apparatus is lowered into the casing 23 until the plate 34 is in the required position; then cement is pumped downwardly through the 2 inch pipe 39 to fill the space above the plate 34 and below the fitting 36 to make the barrier 40.

The bell-shaped fitting 36 may be perforated or the hole through which the pipe 39 passes may be larger than the pipe itself. The pipe 39 is first inserted through the bell-shaped fitting 36 and may extend down near the plate 34 and fresh water circulated through the pipe 39 in order to wash out the mud laden fluid, the cement being forced through the pipe 39 displacing the water or mud laden fluid.

During this operation the plate 34 supports the soft cement. After the cement has been placed in position the 2 inch pipe 39 is removed. After the cement has set hard the cable 38 is cut at its lower end and removed, then the water and mud is pumped from the 12 inch casing to make the dry chamber 41 above the fluid barrier base 30, as shown in Fig. 8.

The conditions shown in Fig. 8 are substantially the same as those shown in Fig. 4. The fluid barrier base 30 is produced in a different way to suit the different conditions, but is substantially the same as the fluid barrier base 15 for the purpose of carrying out the remaining steps in the method and installing the remaining apparatus.

Referring to Figs. 9 and 9$^A$, the well hole 42 extends through the water sand 43 and through the impervious clay stratum 44 to the oil sand 45, and the 12 inch well casing 46 stands in the well with the perforated portion 47 in the oil sand 45 and the fluid barrier base 48 in the clay stratum 44 above the oil sand. This condition may be brought about by either the method shown and described in Figs. 1, 2, 3 and 4, or as shown and described in Figs. 5, 6, 7 and 8. In this condition the water is shut off from the inside of the 12 inch casing above the fluid barrier base 48, but it is not shut off from the outside of the 12 inch casing 46, or from the oil zone 45, and the problem is to stop the water from flowing downwardly from the water sand 43 outside of the casing 46 and thus prevent this heavier water from excluding the lighter oil from running into the well and inwardly into the casings through the perforations 47.

The string 49 of 4½ inch casing 2310 feet long, together with the freezing coil 53 and the freezing coil pipes 66 are all lowered simultaneously into the 12 inch casing until the lower end of the string encounters the bell-shaped fitting 50 and finds its way into the screw threads 51, and then the string is screwed down to make a connection with the first 100 feet 52 of the 4½ inch casing.

The refrigerating plant 54 is placed upon the surface 55 of the ground and both ends of the freezing coil are connected to the plant 54 by means of the freezing coil pipes 66, so that by the operation of the plant 54 a freezing medium is circulated through the freezing coil 53. The chamber 56 in between the 4½ inch casing 49 and the 12 inch casing above the fluid barrier base 48, is practically dry and a non-freezing solution 57 such as calcium chlorid is pumped or poured into this chamber to cover the coils 53, then the refrigerating plant 54 is started and the freezing medium circulated through the coil 53 to chill the non-freezing solution 57 and the mud laden fluid 58 outside of the casing 46 is frozen and the freezing process is continued until the area 59 of the clay is frozen substantially to stop the water from running downwardly from the sand 43 around the casing 46, and the freezing operation is continued to maintain this condition; then the plug 60 is drilled out of the 4½ inch pump tubing conductor casing 49 and 3 inch tubing 63 and 64 is inserted inside of the 4½ inch conductor casing 49 and the pump 61 and rods 67 are lowered inside of the pump tubing 63 to their proper position as shown.

A packer 62 is placed around the pump tubing 63 below the pump mechanism and above the perforations 47 to keep the oil from going upwardly in the space between the 3 inch pump tubing 64 and the 4½ inch pump tubing conductor 49, thus leaving an air space between the 3 inch tubing 64 and the 4½ inch casing 49, thereby forming an insulation to keep the oil from being chilled and its viscosity reduced to such an extent that it cannot be pumped.

In the method described I have also created an air space 68 between the 4½ inch casing and the 12 inch casing 46 above the fluid barrier base 48 which will likewise act as an insulation and prevent a chilling of the oil which is being extracted through the 3 inch tubing 64. If necessary, the air could be pumped out between the 4½ inch casing 49 and the 12 inch casing 46 and also from the space 65 between the 3 inch tubing 64 and the 4½ casing 49, thus producing a vacuum in these two spaces which would provide a better insulation for preventing a chilling of the oil which is within the 3 inch tubing 64.

The water is effectually shut off from the oil zone and the oil pumped or extracted in a suitable way, and the freezing process and the pumping process goes on continuously and simultaneously as long as desired.

It is obvious that the freezing coil 53 and the freezing coil pipes 66 may be lowered before the 4½ inch casing 49 or that the coil 53 and pipes 66 may be lowered down into place inside of the casing 46 and outside of the casing 49 after the casing 49 has been screwed into the threads 51.

I have described a method and apparatus for shutting water out of oil wells, in which the water bearing stratum is located above the oil bearing stratum, which is the usual condition in oil wells. However, the same method and apparatus may be employed where the water bearing stratum is located between the two oil bearing strata, in which case it is advisable to keep the area of the water bearing stratum adjacent thereto in a frozen condition, thereby preventing the water from flowing upwardly to the upper oil bearing stratum and downwardly to the lower oil bearing stratum.

Another condition may exist, namely, where the water is encountered below the oil bearing stratum, in which case the water is frozen so as to prevent its upward flow to the oil bearing stratum.

While I have described my method and apparatus for shutting water out of oil wells I desire it to be understood that my invention is not limited to oil wells, as the same may be used in connection with shutting water out of gas, mineral, and other fluid wells.

I claim:

1. A method for shutting water out of fluid wells, such as oil wells, which consists in freezing the water in the area between the water stratum and the fluid stratum to prevent the flow of water from said water stratum to said fluid stratum.

2. A method for shutting water out of fluid wells, such as oil wells, which comprises forming a fluid barrier base in the well casing below the water area, closing the fluid barrier base, removing the water from the casing, at least above the area to be frozen above the fluid barrier base, lowering the temperature in the casing above the fluid barrier base to a point below the freezing point of water to freeze the area around the well casing to keep the water from flowing downwardly; and opening the fluid barrier base and removing the fluid from below the frozen area.

3. The method of shutting water out of fluid wells, such as oil wells, which comprises forming a fluid barrier base in the well casing below the water area, closing the fluid barrier base, pumping the fluid out of the casing above the fluid barrier base, connecting a small casing to the fluid barrier base, cooling the area around the well casing to freeze the water and prevent the same from flowing downwardly, opening the fluid barrier base and pumping the fluid from below the frozen area.

4. The method for shutting water out of fluid wells, such as oil wells, comprising placing mud in the bottom of an oil well casing and forcing the mud around the casing to the area for shutting off the water, placing a fluid barrier base in the well casing below the water zone, closing the fluid barrier base, pumping the fluid from the well casing above the fluid barrier base, connecting a small casing to the fluid barrier base, freezing the mud around the casing and the adjoining area, opening the fluid barrier base, and continuing the freezing operation and pumping operation.

5. The method for shutting water out of fluid wells, such as oil wells, which consists of freezing the area around the well casing below the water zone and above the fluid zone, and continuing the freezing operation and pumping the fluid.

6. The method for shutting water out of fluid wells, such as oil wells, comprising forming a fluid barrier base in the well casing, placing a fluid barrier base and casing into the well, closing the fluid barrier base, pumping the water out of the casing above the fluid barrier base, connecting a small casing to the fluid barrier base, placing a freezing apparatus between the well casing and the small casing above the fluid barrier base by means of which the water and water bearing formation is frozen around the well casing and the adjoining area to prevent the water from entering the fluid zone, opening the fluid barrier base, and inserting a pumping apparatus inside of the small casing and pumping the fluid simultaneously with the freezing operation.

7. An apparatus for shutting water out of fluid wells, such as oil wells, comprising a fluid barrier base fixed in the well casing below the water zone and above the fluid zone, a small casing connected to the fluid barrier base, a freezing coil in the well casing above the fluid barrier base around the small casing, a refrigerating plant connected to the freezing coil, and a pump line within the small casing extending through the fluid barrier base to the fluid so that the freezing operation and pumping operation may be carried on simultaneously and continuously.

8. An apparatus for shutting water out of fluid wells, such as oil wells, comprising a refrigerating plant, a coil connected to the refrigerating plant and extending into the well casing to a point below the water zone and above the fluid zone and adapted for freezing the area around the well casing to stop the water from flowing downwardly from the water zone to the fluid zone, and means for pumping fluid from the fluid zone.

9. An apparatus for shutting water out of fluid wells, such as oil wells, comprising a fluid barrier base fixed in the fluid well casing below the water zone and above the fluid zone, a small casing connected to the fluid barrier base, a freezing apparatus in the well casing above the fluid barrier base around the small casing, a refrigerating plant connected to the freezing apparatus, and a pump line within the small casing extending through the fluid barrier base to the fluid zone so that the freezing operation and pumping operation may be carried on simultaneously and continuously.

10. An apparatus for shutting water out of fluid wells, such as oil wells, comprising a refrigerating plant, a coil connected to the refrigerating plant and extending into the fluid well casing to a point below the water zone and above the fluid zone and adapted for freezing the area around the well casing to stop the water from flowing downwardly from the water zone to the fluid zone, and means for pumping the fluid from the fluid zone.

11. An apparatus for shutting water out of fluid wells, such as oil wells, comprising a fluid barrier base fixed in the well casing, a refrigerating apparatus, a freezing apparatus in the well casing above the fluid barrier base connected to the refrigerating apparatus and adapted for freezing the area around the well casing and preventing the water from reaching the fluid zone.

In testimony whereof I have signed my name to this specification.

DWIGHT G. VEDDER.